United States Patent [19]

LaRaus

[11] 4,104,166

[45] Aug. 1, 1978

[54] APPARATUS FOR PURIFYING SEPTIC TANK EFFLUENT

[76] Inventor: Julius LaRaus, 150 Crandon Way, Rochester, N.Y. 14618

[21] Appl. No.: 687,041

[22] Filed: May 17, 1976

[51] Int. Cl.$^2$ .......................... C02B 1/38; B01D 21/02
[52] U.S. Cl. ........................... 210/195 R; 210/198 R; 210/256; 210/259; 210/275; 210/290; 261/DIG. 42; 261/21
[58] Field of Search ................... 210/192, 194, 195 R, 210/63 Z, 82, 256, 532 S, 170, 24; 261/DIG. 5, DIG. 27, DIG. 42, DIG. 70, 6, 119 R, 123, 125, 21

[56] References Cited

U.S. PATENT DOCUMENTS

| | | | |
|---|---|---|---|
| 3,051,315 | 8/1962 | Boester | 210/532 S X |
| 3,054,602 | 9/1962 | Proudman | 261/DIG. 70 |
| 3,276,994 | 10/1966 | Andrews | 210/63 Z X |
| 3,681,236 | 8/1972 | Bergles et al. | 210/532 S X |
| 3,685,656 | 8/1972 | Schaefer | 210/195 R |
| 3,733,268 | 5/1973 | Marschall | 210/63 Z X |
| 3,945,918 | 3/1966 | Kirk | 261/125 X |
| 3,950,249 | 4/1976 | Eger et al. | 210/256 X |

FOREIGN PATENT DOCUMENTS 200,914  2/1956  Australia ................................. 210/63 Z

OTHER PUBLICATIONS 598,798  5/1960  Canada ....................................... 210/63 Z Primary Examiner—Morris O. Wolk
Assistant Examiner—Arnold Turk
Attorney, Agent, or Firm—Shlesinger, Fitzsimmons & Shlesinger

[57] ABSTRACT

Placed in the ground adjacent a conventional septic tank are a purification tank, which contains a smaller, cylindrical filter tank, and a plurality of spaced, parallel, vertically-disposed ozonating tanks, which are located in an annular space between the filter tank and the purification tank. Perforated diffusers in the lower ends of the ozonating tanks are connected to an ozone generator which intermittently supplies ozone gas to the diffusers. Liquid effluent from the septic tank is fed to the lower end of the filter tank and passes upwardly through a removable, porous filter, then successively through the ozonating tanks, then into the space or reservoir formed in the purification tank around the outsides of the filter tank and ozonating tanks, and finally through an overflow outlet to a surrounding leach field. Excess ozone gas is piped from the upper ends of the ozonating tanks back to the septic tank to increase the effectiveness of the septic tank.

7 Claims, 6 Drawing Figures

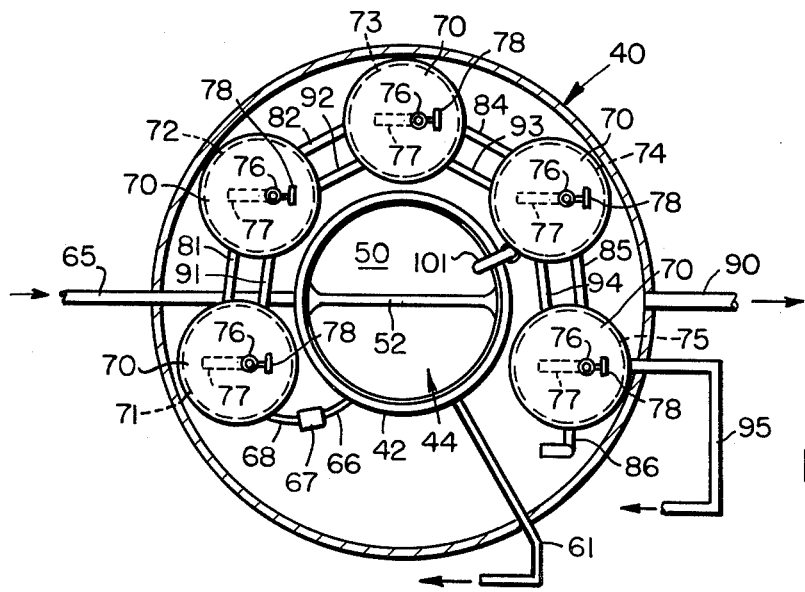
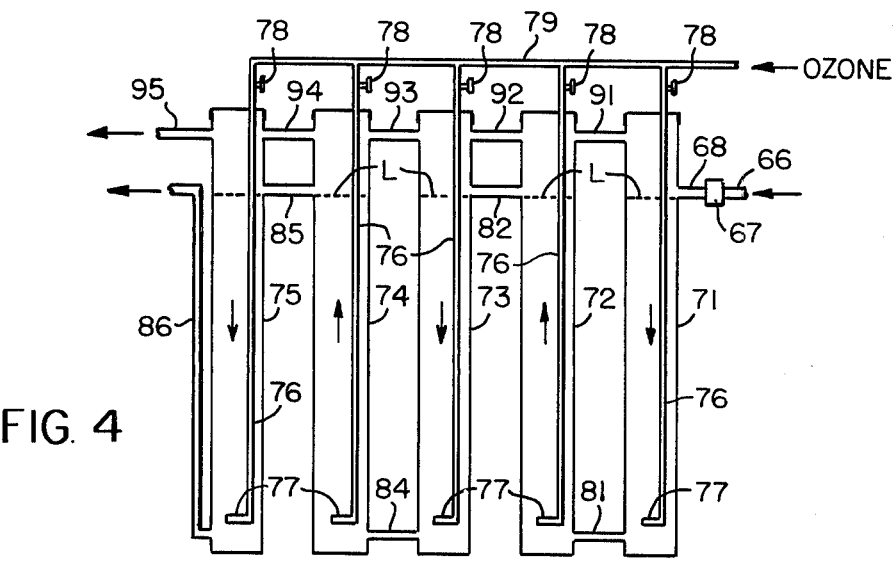
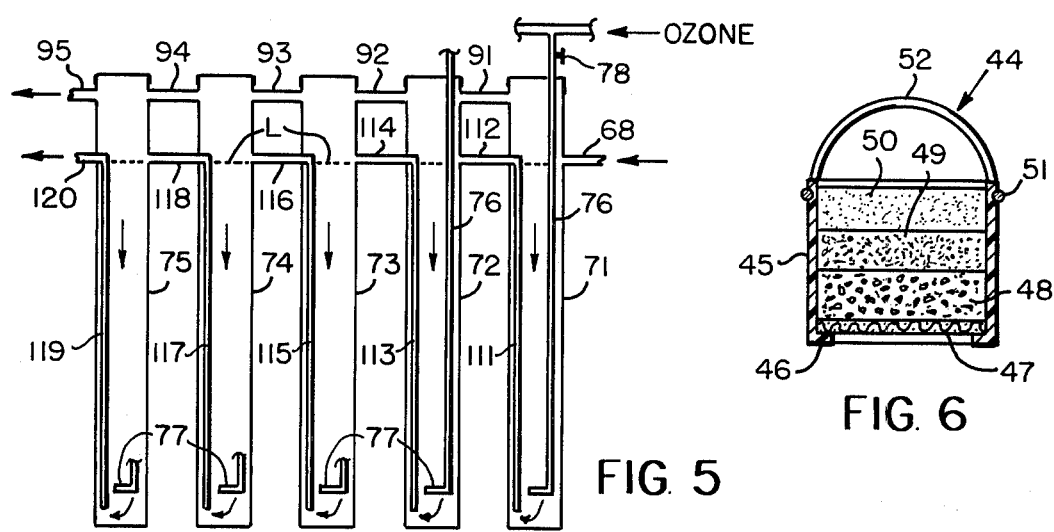

APPARATUS FOR PURIFYING SEPTIC TANK EFFLUENT

This invention relates to waste water treatment, and more particulraly to an improved method and apparatus for purifying septic tank effluent.

Conventional septic tanks produce a liquid effluent which is leached into the soil around the tank through a system of drain tile, or the like. Upon being leached into the soil, aerobic bacteria act upon the effluent to purify it by a process of oxidation. While under ideal conditions this process is reasonably effective in removing undesirable odors and bacteria from the effluent, this effectiveness will vary considerably depending upon various factors, including the type of soil into which the effluent is leached, the capacity of the system in relation to the number of persons utilizing the facilities serviced by the septic tank, etc.

It has been discovered, however, that the reliability and efficiency of such systems can be enhanced considerably by adding additional purification apparatus to clean the septic tank effluent before it is discharged into a leach field, or the like.

It is an object of this invention, therefore, to provide an improved process for purifying the effluent of septic tanks, thereby enabling such tanks to function reliably and effectively regardless of the nature of the soil into which the effluent is discharged.

Another object of this invention is to provide novel apparatus for purifying the effluent of septic tanks, and the like, so that undesirable solids, odors and chemicals are removed from the effluent before it is leached.

A more specific object of this invention is to provide combination filtering and ozonating apparatus at least a portion of which is adapted to be buried in the ground adjacent a septic tank to receive and purify the effluent therefrom before the effluent is leached into the surrounding ground.

Other objects of the invention will be apparent hereinafter from the specification and from the recital of the appended claims, particularly when read in conjunction with the accompanying drawings.

In the drawings:

FIG. 3 is an enlarged, fragmentary plan view of this tank with its cover removed to illustrate the arrangement of several ozonating tanks contained within this purification tank;

FIG. 4 is a fragmentary elevational view illustrating schematically one manner in which the ozonating tanks of FIG. 3 may be connected to each other;

FIG. 5 is a fragmentary elevational view of still another way in which these ozonating tanks can be connected to provide a counterflow relation between the septic tank effluent and the ozone gas employed in these tanks; and FIG. 6 is an enlarged, vertical sectional view taken through the center of a filter unit which is adapted to be employed in this apparatus.

Figure 1:
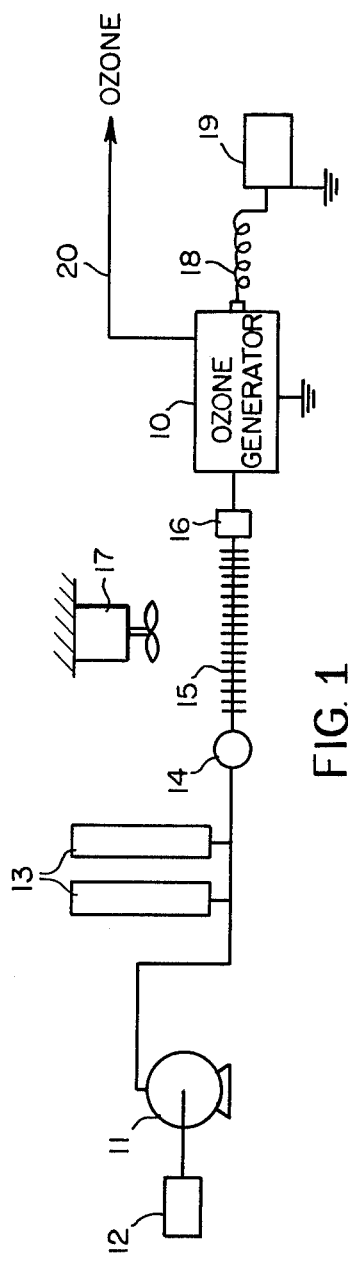
FIG. 1 is a schematic view illustrating ozone generating apparatus and controls therefor which can be utilized to supply ozone gas to purification apparatus of the type made according to one embodiment of this invention.

Referring now to the drawings by numerals of reference, and first to FIG. 1, 10 denotes a conventional ozone generator to which compressed air is supplied by an air compressor 11, which has an air inlet filter 12 for removing undesirable dust particles, and the like from incoming air. The output of the compressor 11 is dried by a pair of air dryers 13 and passes through a pressure regulator 14, a finned cooling pipe 15, and an expansion valve 16, which is located in the input to the ozone generator to effect adiabatic cooling of the incoming air. A fan 17 is also placed adjacent the pipe 15 to direct cooling air thereover.

The high voltage coil in the generator 10, which is denoted schematically at 18 in FIG. 1, is energized or otherwise controlled by a conventional timer circuit, which is denoted generally at 19. The circuit, which forms no part of this invention, may be set to energize the generator 10 periodically to supply ozone gas to its output line 20. The output of the generator 10 comprises a mixture of ozone gas and air, and is fed by the line 20 to a plurality of ozone tanks of the type described in greater detail hereinafter.

Figure 2:
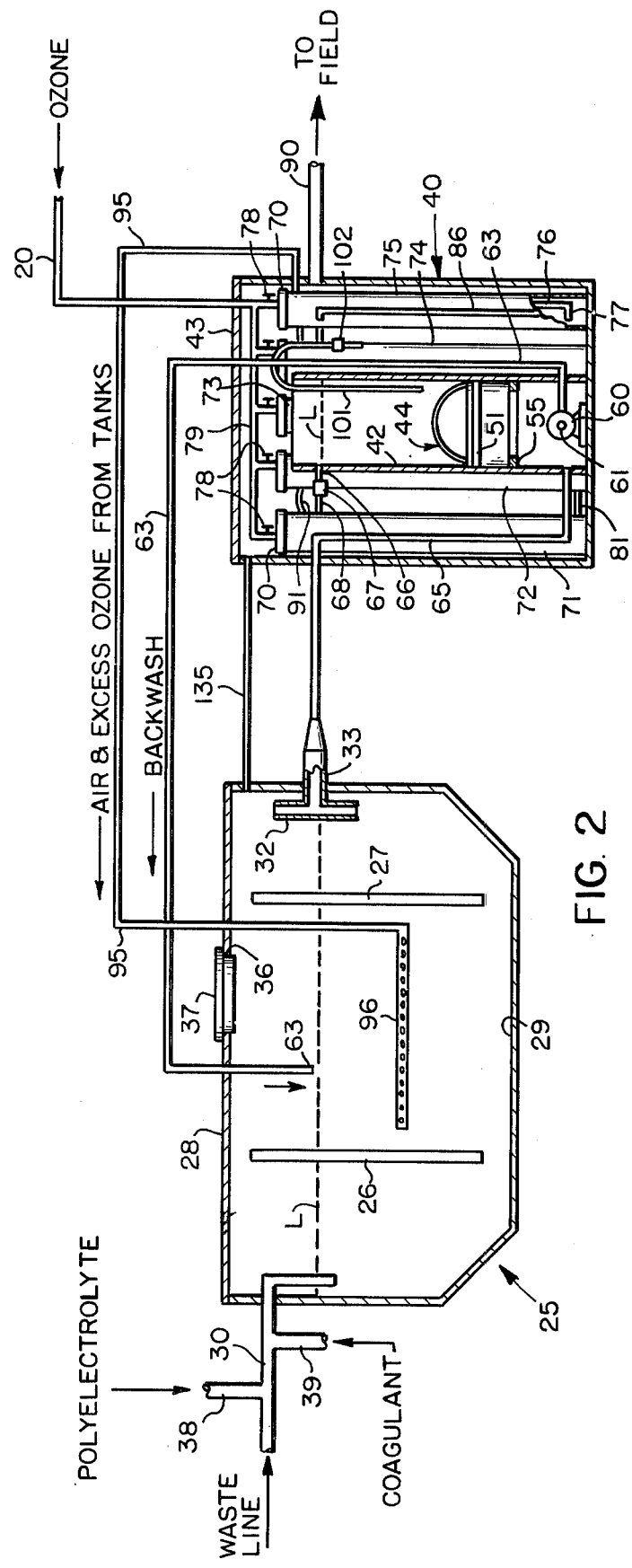
FIG. 2 is a fragmentary sectional view taken on a vertical plane through a purification tank which forms part of the above-noted purification apparatus, the tank being shown connected to the output or effluent of a conventional septic tank.

Referring now to FIG. 2, 25 denotes generally a conventional septic tank containing a pair of spaced, parallel, transversely extending baffle members 26 and 27, the upper edges of which are spaced slightly beneath the septic tank cover 28, and the lower edges of which are spaced slightly above the bottom 29 of the tank in the usual manner, so that sewage entering the tank through the waste line 30 must pass beneath the lower ends of the baffles 26 and 27 in order to reach the generally T-shaped outlet pipe 32, which is secured in the outlet end of tank 25. The horizontally disposed leg 33 of the outlet pipe 32 is located at a level which is spaced slightly beneath the inlet pipe or waste line 30, so that the level L (broken lines in FIG. 2) of the sewage in tank 25 normally will not rise above the outlet leg 33.

The tank cover 28 contains the usual cleaning opening 36 covered by a removable lid 37 to enable the tank to be pumped out or otherwise serviced, when necessary. Moreover, if required, the waste line 30, which is connected to the household plumbing or other system serviced by the tank 25, may be connected by a pipe 38 to a supply of a polyelectrolyte, and by a pipe 39 to a coagulant supply, so that desired quantities of these materials can be added to the waste prior to its discharge into the septic tank. The system, however, will work satisfactorily without this feature.

Referring now to the embodiment illustrated in FIGS. 2 to 4 and 6, 40 denotes a cylindrical purification tank, which is adapted to be placed in the ground adjacent the septic tank 25. A cylindrical filter tank 42 of smaller diameter and height than tank 40 is secured at its lower end coaxially to the bottom of tank 40, and has an open upper end spaced beneath the cover or lid 43 of tank 40.

Removably mounted on a ring or annulus 55 which is secured in tank 42 intermediate its ends, is a cylindrical filter unit 44. This unit comprises a plastic, tubular housing 45 (FIG. 6) having around its lower end an internal, circumferential flange 46. Seated on this flange across the lower, open end of housing 45 is a generally disc-shaped stainless steel screen 47. Supported on screen 47 is a layer 48 of peat gravel, which is covered in turn by layer 49 of anthrofil or granulated coal, and a layer 50 of fine sand. Surrounding the upper end of housing 45, and seated in an annular recess in its outer surface, is a resilient O-ring or gasket 51, which has sealing engagement with the inner peripheral surface of tank 42, when the filter unit 44 is mounted therein as shown in FIGS. 2 and 3. An integral handle 52 is formed on the upper end of housing 45 to enable the filter unit readily to be inserted into, or withdrawn from, the tank 42.

Mounted in the lower end of tank 42 on the bottom of tank 40, and beneath the filter 44, is a backwash pump 60, which has an inlet 61 communicating with the bore of tank 42 beneath the filter, and an outlet connected by a pipe 63 with the interior of the septic tank 25. The discharge end of the pipe 63, it will be noted, is disposed above the level of the sewage in tank 25 for purposes noted hereinafter.

Adjacent its lower end, the filter tank 42 is connected by a pipe 65 with the outlet pipe 33 of the septic tank 25, so that effluent from tank 25 is fed into the bottom of the tank 42 beneath the filter 44. Adjacent its upper end tank 42 has an outlet pipe 66, which is connected through a conventional flap valve 67 and an inlet pipe 68 to the upper end of a cylindrical, vertically disposed ozonating tank 71, the lower end of which is seated on the bottom of tank 40 in the radial space between tanks 40 and 42.

Also seated on the bottom of tank 40 and extending upwardly in the annular space between tanks 40 and 42, and in spaced, parallel relation to one another and to tank 71, are four additional ozonating tanks 72, 73, 74 and 75, which are similar in construction to tank 71. The tanks 71 to 75 are sealed at their upper ends by identical, removable covers 70; and each contains an ozone supply pipe 76 which projects at its upper end through the associated tank cover 70, and which has on its lower end a perforated, right-angular diffusion section 77, which is spaced just above the bottom of the associated ozonating tank. At their upper ends the ozone supply pipes 76 are connected through separate, manually-operable gate valves 78, or the like, with a manifold pipe 79 (FIG. 2), which is connected to the ozone supply pipe 20. The valves 78 are adjustable to allow ozone gas to pass downwardly through the pipes 76, and to be released through the perforations in the diffusing sections 77 so that the ozone gas will bubble upwardly in each tank 71 to 75, when the apparatus is in use, as noted hereinafter.

To cause the filtered fluid from the tank 42 to pass successively through the ozonating tanks 71 to 75, the tank 71 is connected adjacent its lower end by a pipe 81 (FIGS. 2 to 4) to the lower end of the adjacent tank 72. Tank 72, at a height corresponding to the water level L, is connected by a pipe 82 to the upper end of the next adjacent tank 73, which, in turn, is connected adjacent its lower end by a pipe 84, with the lower end of the tank 74. At its upper end tank 74 is connected at a height approximating the water level L by a further pipe 85 to the upper end of the last ozonating tank 75. Adjacent its lower end tank 75 has an outlet connected to a vertically disposed discharge pipe 86, the upper end of which opens on the annular space between tanks 40 and 42, and at a level or height equivalent to that of the desired level L of the sewage in the system. Consequently, the filtered and ozonated fluid that is discharged from the pipe 86 is stored in the annular space formed between tanks 40 and 42, and around the outsides of the ozonating tanks 71 to 75. This space constitutes a reservoir for holding effluent after it has passed through the filtration and ozonating stages of the system.

Adjacent the upper end of tank 40 an outlet pipe 90 is connected to an opening in the tank at the level L to allow excess fluid from the reservoir to flow into the leach field (not illustrated) which normally would be located around the outside of the tanks 25 and 40.

Above the pipes 82 and 85, so as to be located above the level L of the fluid contained in the ozonating tanks, these tanks 71 to 75 are interconnected by a pipe 91 (FIGS. 2 to 4), which extends between the upper ends of tanks 71 and 72; by a pipe 92, which extends between the upper ends of tanks 72 and 73; by a pipe 93, which extends between the upper ends of tanks 73 and 74, and by a pipe 94, which extends between the upper ends of tanks 74 and 75. Tank 75 is also connected at its upper end by a return pipe 95 with a perforated, horizontally disposed diffusion pipe 96 (FIG. 2), which is located in the septic tank 25 above the bottom 29 of the tank, and between the baffles 26 and 27. The purpose of pipes 91 to 96 is to allow any foam, and/or excess ozone gas, which may otherwise accumulate in the upper ends of the ozonating tanks 71 to 75, to pass through these tanks and the pipe 95 back to the septic tank 25, where the gases can be utilized to improve the effectiveness of tank 25.

In practice, the ozone generator 10 and the associated equipment illustrated in FIG. 1 may be placed in a separate cabinet in a garage or basement, or in a weatherproof box placed outside of the building that is to be serviced by the septic tank 25 and its filtering apparatus. The generator may be of the conventional variety which can be powered by 115 volt AC power supply, which may be increased up to 500 cycles, if necessary, by means of a solid state frequency changer (not illustrated). Each upward change in the frequency, of course, increases the ozone production.

The expansion valve 16 is designed to drop the air pressure from, for example, approximately 60 lbs. per sq. inch to 8 to 10 lbs. per sq. in., thus producing the desired adiabatic cooling of the air as it enters the ozone generator 10. The generator may be of the plate, wire grid or glass tube constructions, with the negative generator plates thereof being grounded for safety purposes. The generator may be charged by a transformer at a rating of 4000 to 5000 volts, 20ma from the secondary coil, one end of which is grounded to the common mounting plate of the generator. The timer circuit 19 is set to turn on the ozone generating system intermittently, for example for 15 to 30 minutes each hour.

In use, and assuming that the system is full so that the level L of the liquid in the tanks 25 and 40, and in the ozonating tanks 71 to 75, is equal, then any additional fluid entering tank 25 will cause a corresponding amount to be discharged from the outlet 90 to the leach field. Under these circumstances, water or effluent entering the filter tank 42 from tank 25, passes upwardly through the filter 44 and overflows through the check or flap valve 67 to the upper end of tank 71. As illustrated diagrammatically in FIG. 4, any fluid entering the upper end of tank 71 must flow downwardly in the tank against the flow of any ozone gas which may be discharged from time to time from the diffuser 77 positioned adjacent the lower end of tank 71. The same fluid must then pass through pipe 81, and upwardly through tank 72, and then through pipe 82 and downwardly through tank 73. The fluid continues through pipe 84 and upwardly in tank 74 and through pipe 85 and then downwardly through tank 75 and finally upwardly through pipe 86 into the reservoir defined by the remaining space in tank 40 around the outside of filter tank 42. Any excess filtered liquid will be discharged through the outlet 90.

During this time, periodic operation of the ozone generator 10 will cause ozone gas to be fed through pipe 20 to the bottoms of the ozonating tanks 71 to 75. As this gas bubbles upwardly through the filtered fluid in these tanks, it operates in known manner to kill various forms of undesirable bacteria, and also increases the amount of dissolved oxygen in the fluid. Excess ozone gas, air and foam, if any, are free to pass out of the openings formed in the upper ends of the tanks 71 to 75 above the liquid level L, and through the pipes 91, 92, 93, 94 and 95 to the diffuser 96 in the septic tank 25.

After repeated operation, the pores of the filter 44 tend to become clogged. To correct this matter, conventional control means can be employed to energize the pump 60 to effect backwash of the filter, by drawing fluid through the inlet 61 of the pump, and pumping this fluid back through the pipe 63 to the septic tank 29. During this operation the level of the liquid in tank 42, will drop rapidly; and in order to provide enough clean water or fluid to backwash the filter, a siphon hose 101 (FIGS. 2 and 3) is supported by a bracket 102 from the tank 74 so that one end of the hose communicates with the reservoir around the outside of the tank 42, and the opposite end with tank 42 above the filter 44. Thus, during a backwash operation, when the level of the liquid in the reservoir falls below the outer or upper end of the hose 101, as shown in FIG. 2, the siphon or vacuum created in the hose 101 will terminate, and this phenomenon can be utilized automatically, if desired, to shut off the pump 60 in any known manner.

If the filter 44 becomes excessively dirty or in need of replacement or service, it can be withdrawn by its handle 52 from within the tank 42 upon removal of the lid or cover 43 from the outer tank 40.

Referring now to FIG. 5, wherein like numerals are employed to denote elements similar to those employed in the embodiment illustrated in FIGS. 1 to 4, the tanks 71 to 75 are designed so that the fluid travelling therethrough must travel downwardly in each tank and then upwardly through the inlet of the next tank. Tank 71, for example, contains a vertical riser pipe 111, the lower end of which opens on the interior of tank 71 beneath the ozone diffuser 77, and the upper end of which is connected to a horizontally disposed pipe 112, which is positioned to register with the desired level L of the fluid in the tanks. Pipe 112 is connected to the upper end of the next ozonating tank 72 in the series thereof; and tank 72 likewise contains a riser pipe 113, which opens at its lower end adjacent the bottom of tank 72, and which is connected at its upper end through a horizontally disposed outlet pipe 114 with the upper end of the next tank 73. Similarly, tanks 73, 74 and 75 contain riser pipes 115, 117 and 119, respectively, which are connected at their upper ends to outlet pipes 116, 118 and 120, respectively. Pipe 116 is connected to the upper end of tank 74; pipe 118 is connected to the upper end of tank 75; and pipe 120 opens on the reservoir located in tank 40 around the outside of the filter tank 42 in the same manner as in the first embodiment. With the apparatus illustrated in FIG. 5, there is a counterflow of the fluid relative to any ozone gas diffused into the five ozonating tanks 71 to 75.

In the above-described apparatus the tank 40 may be made from, for example, Fiberglas or the like, and the tubular or cylindrical ozonating tanks 71 to 75 can be made, if desired, from a polyvinyl chloride material. Although the addition of a coagulant and polyelectrolyte to the wastewater before entry to the septic tank 25 will reduce the settling time for solids, it has been found that these supplements are necessary only where the septic tank is not quite large enough to handle the quantity of effluent it receives from the associated household.

In one installation of the above-noted apparatus, the filter housing 45 contained a 6-inch layer 48 of peat gravel, covered by a 3-inch layer 49 of anthrofil, and a 3-inch layer 50 of washed sand. During operation of the pump 60 for backwash purposes, approximately 50 gallons of water were drawn by the pump downwardly for approximately a 10-minute interval, the additional water needed being drawn from the surrounding reservoir by the siphon hose 101. This backwash operation can be performed automatically and periodically, if desired, for example by use of a timer which intermittently operates the pump 60 in any known manner.

The excess ozone gas and air which is conveyed by the pipe 95 back to the septic tank 25 activates the aerobic bacteria, and the excess ozone gas diffused out of pipe 96 oxidizes the suspended solids in the septic tank. This operation produces a preozonation phase, and increases the rate of settling, and the actions of the aerobic bacteria, and the anerobic bacteria at the bottom of the septic tank.

As shown in FIG. 2, the excess ozone and air which accumulates at the top of tank 25 can be fed by a pipe 135 back to the top of tank 40 above the level of the liquid in the reservoir section of the tank, so that it can pass out of the pipe 90 and be fed to the leaching field where it increases the action of the anerobic bacteria and soil bacteria to help keep the field clean and unclogged.

Some researchers claim that the bacteria in the soil around the leach field pipes cause poor circulation, while others claim that it is the solids that pass from the septic tanks into the leach field that cause clogging. Still others claim that a coating of ferric sulphide on the inside of the pipes and soil around the pipes tend to block the pores in the field. With applicant's above-noted system, however, the solids are removed, the E coli are reduced to zero, upwards of 97% of the virus are killed, odors and colors are eliminated from the effluent, and sulphides are removed and sulphates are reduced to minimum levels, as are nitrates and turbidity. As a result, a clear, liquid effluent is allowed to flow through pipe 90 into the leach field.

One of the reasons for employing a plurality of diffusion tanks 71 to 75 is to reduce the height of the system. For example, it has been discovered that, when fluid flows in an ozone atmosphere for height of 16 feet, approximately 95% of the ozone gas which is diffused into a liquid will be absorbed, and the dissolved oxygen level thereof will reach 10ppm and higher. However, to avoid the necessity of using a single 16 foot high tank, a plurality of shorter tanks are used, and the effluent is fed sucessively through the tanks so that it will travel a distance approximately equivalent to at least 16 feet before being discharged into the reservoir in tank 40. This provides a maximum contact time with the ozone gas, and results in a more complete kill of bacteria, oxidation of the dissolved organics, aeration by stripping of ammonia, and increases dissolved oxygen in the effluent.

Appropriate safety devices can be employed to provide visual or audible alarms if a failure occurs in one or more of the electrically operated units utilized in the above-noted system.

The clean effluent discharged from pipe 90 may be used for different purposes, rather than being leached into a field. For example, by using a separate piping system connected to outlet 90, (not illustrated) the cleaned effluent could be used for irrigational purposes, or reused for toilet use in the home, lawn sprinkling, or possibly could be piped into a grade "A" stream or lake. Because the cleaned effluent contains no solids, it requires a smaller leach field than the ordinary septic tank system. The system may employ a septic field in which the clear water effluent is evaporated upwardly through a sand bed and topsoil as developed, for example, by A. P. Bernhart of the University of Toronto, and known as the evapo-transportation system.

While the invention disclosed herein has been described in detail in connection with only certain embodiments thereof, it will be apparent that it is capable of further modification, and that this application is intended to cover any such modifications as may fall within the scope of one skilled in the art or the appended claims.

If required by building or space conditions the effluent from the septic tank may run into a sump in which a float controlled sump pump will pump the effluent from the sump to the tanks as described, which may be placed above ground in some appropriate location. The excess liquid will then flow by gravity from the last opening in the reservoir in the tank through a pipe connecting it to the leach field.

Having thus described my invention, what I claim is:

1. Apparatus for purifying septic tank effluent, comprising
    a first tank adapted to be placed in the ground adjacent a septic tank,
    a plurality of ozonating tanks smaller than said first tank and mounted in said first tank in spaced relation,
    a filter tank also smaller than said first tank and mounted therein in spaced relation to said ozonating tanks,
    a first pipe for connecting said filter tank to an adjacent septic tank to have the liquid effluent from the septic tank pass substantially at atmospheric pressure through said filter tank from an inlet adjacent one end of said filter tank to an outlet adjacent its opposite end,
    a filter mounted in said filter tank between said inlet and said outlet to filter solids from the liquid passing through said filter tank,
    means connecting said ozonating tanks in series with one another and to the outlet of said filter tank to cause filtered liquid from said filter tank to pass longitudinally and successively through the ozonating tanks in said series thereof, and for a cumulative distance greater than sixteen feet, and
    means for supplying ozone gas to each of said ozonating tanks for contact with the fluid passing therethrough,
    the last ozonating tank in said series thereof having an outlet adjacent its upper end thereof for discharging ozonated effluent from said last tank into a storage space formed in said first tank around the outsides of said ozonating tanks and said filter tank, and
    said first tank having an outlet disposed at approximately the same level as the outlet in said last ozonating tank to allow discharge of excess effluent from said storage space.

2. Apparatus as defined in claim 1, wherein
    said means connecting said ozonating tanks include spaced inlet and outlet means located adjacent opposite ends, respectively, of each of said ozonating tanks,
    the inlet means of the first tank in said series of ozonating tanks is connected to the outlet of said filter tank, and the inlet means of each of the remaining ozonating tanks in said series is connected to the outlet means of the next preceding ozonating tank in said series.

3. Apparatus as defined in claim 1, wherein
    said means connecting said ozonating tanks comprises a plurality of pipes interconnecting said ozoinating tanks and operative to maintain the level of filtered liquid at a predetermined equal level in said ozonating tanks during operation of said apparatus, said level being spaced beneath upper ends of said ozonating tanks,
    said ozone supplying means comprises an ozone supply pipe extending into each of said ozonating tanks to discharge ozone gas into said ozonating tanks beneath the level of liquid therein, and
    means connects the spaces in the upper ends of said ozonating tanks, above the level of the liquid therein, to a common discharge pipe adapted to be connected to an adjacent septic tank.

4. Apparatus as defined in claim 1, including
    a backwash pump mounted in said filter tank beneath said filter and having an inlet connected to the inside of said filter tank beneath said filter, and
    a discharge pipe connecting the output of said pump to the exterior of said filter tank, whereby upon operation of said pump the filtered liquid above said pump is drawn downwardly through said filter to said discharge pipe.

5. In combination with a septic tank, apparatus operable at atmospheric pressure for purifying liquid effluent flowing by gravity from the outlet of the septic tank, comprising
    a holding tank mounted adjacent the septic tank and having an outlet positioned at approximately the same level as the outlet of the septic tank,
    a filter tank mounted in said holding tank in spaced relation to its inside surface,
    a plurality of ozonating tanks mounted in a space formed in said holding tank around the outside of said filter tank, said ozonating tanks being disposed in spaced relation to each other,
    means for feeding liquid effluent by gravitational flow from the outlet of said septic tank longitudinally and successively through said filter and said ozonating tanks to said space in said holding tank,
    a porous filter removably mounted in said filter tank intermediate the ends thereof to filter solids from the liquid passing through said filter tank,
    means for supplying ozone gas to each of said ozonating tanks for contact with the liquid passing therethrough, and
    said means for feeding liquid effluent including a plurality of openings in said ozonating tanks adjacent upper ends thereof and positioned approximately at the level of the outlet of said septic tank whereby the maximum level of the liquid in said ozonating tanks is spaced beneath the upper ends of said ozonating tanks, and means connecting the spaces in the upper ends of said ozonating tanks with the interior of said septic tank, thereby to convey excess ozone gas from said ozonating tanks to the liquid in said septic tank.

6. The combination as defined in claim 5, wherein said feeding means includes means for causing filtered liquid from said filter tank to pass in the same direction through each of said ozonating tanks and against the flow of ozone gas in the last-named tanks.

7. The combination as defined in claim 5, wherein said filter comprises a rigid housing open at opposite ends and containing superposed layers of gravel, granulated coal, and sand, through which the liquid effluent from the septic tank passes successively during its travel through said filter tank.

* * * * *